United States Patent [19] [11] 4,117,651
Martin, Jr. [45] Oct. 3, 1978

[54] LAWN MOWER WITH CUTTER BLADE INTERLOCK

[75] Inventor: Herman H. Martin, Jr., Galesburg, Ill.

[73] Assignee: Outboard Marine Corporation, Waukegan, Ill.

[21] Appl. No.: 704,282

[22] Filed: Jul. 12, 1976

[51] Int. Cl.² .......................................... A01D 75/20
[52] U.S. Cl. ................................... 56/10.5; 56/11.3; 123/179 K; 192/0.094
[58] Field of Search ..................... 56/10.2, 10.5, 11.3, 56/11.8; 123/179 K, 179 SE; 192/0.058, 0.094, 0.09, 0.046, 3.63, 11

[56] References Cited
U.S. PATENT DOCUMENTS

| 3,229,452 | 1/1966 | Hasenbank | 56/10.5 |
| 3,608,285 | 9/1971 | Berk | 56/10.2 |
| 3,731,471 | 5/1973 | Bening | 56/10.5 |
| 3,739,763 | 6/1973 | Berry | 123/179 K |
| 3,773,156 | 11/1973 | Nyquist | 56/10.2 X |
| 3,782,084 | 1/1974 | Harkness | 56/10.5 |
| 3,958,398 | 5/1976 | Fuelling, Jr. et al. | 56/10.5 |

Primary Examiner—Jay N. Eskovitz
Attorney, Agent, or Firm—Michael, Best & Friedrich

[57] ABSTRACT

Disclosed herein is a lawn mower comprising a rotatable cutter blade supported on a frame, a prime mover supported on the frame, a selectively operable starter mechanism connected to the prime mover for starting thereof, a drive mechanism for selectively connecting the prime mover in driving engagement with the cutter blade, which drive mechanism is movable between a first or drive position wherein the prime mover is drivingly engaged with the cutter blade and a second or disengaged or neutral position wherein the prime mover is disengaged from the cutter blade, a spring biasing the drive mechanism toward the second or disengaged position, and an interlock operably connected to the drive mechanism and to the starter mechanism for preventing starting of the prime mover when the drive mechanism is in the first or drive position.

17 Claims, 5 Drawing Figures

U.S. Patent  Oct. 3, 1978  4,117,651
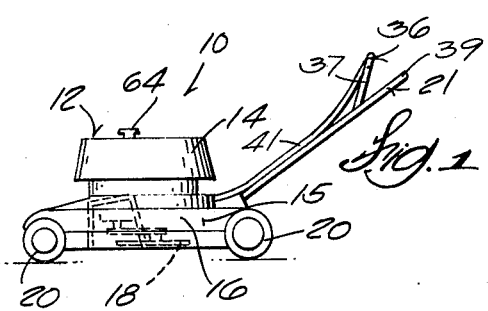
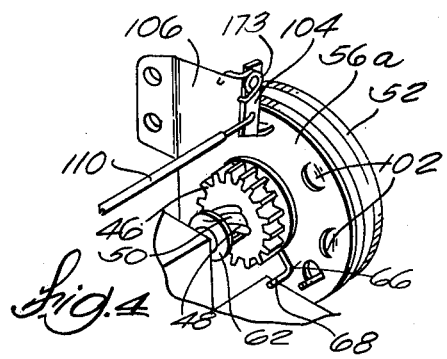
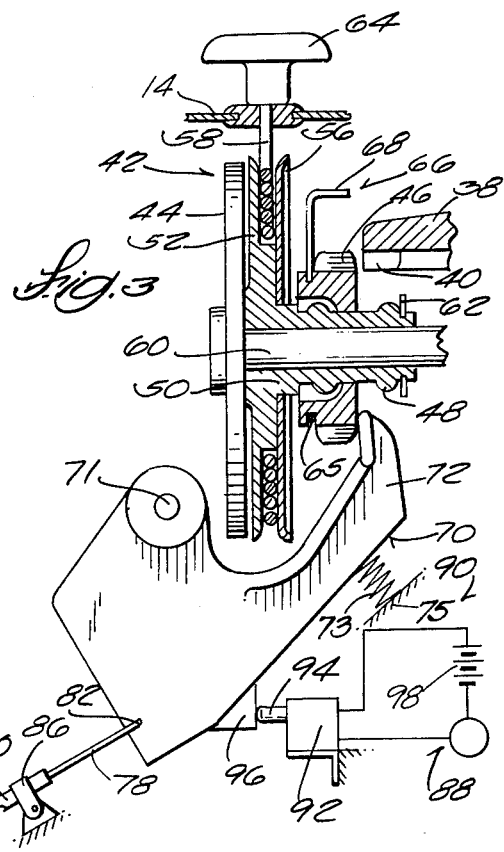
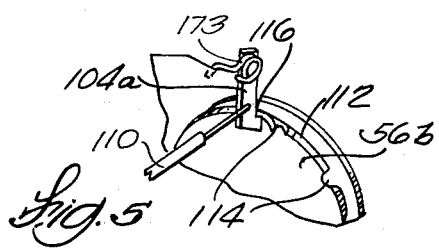
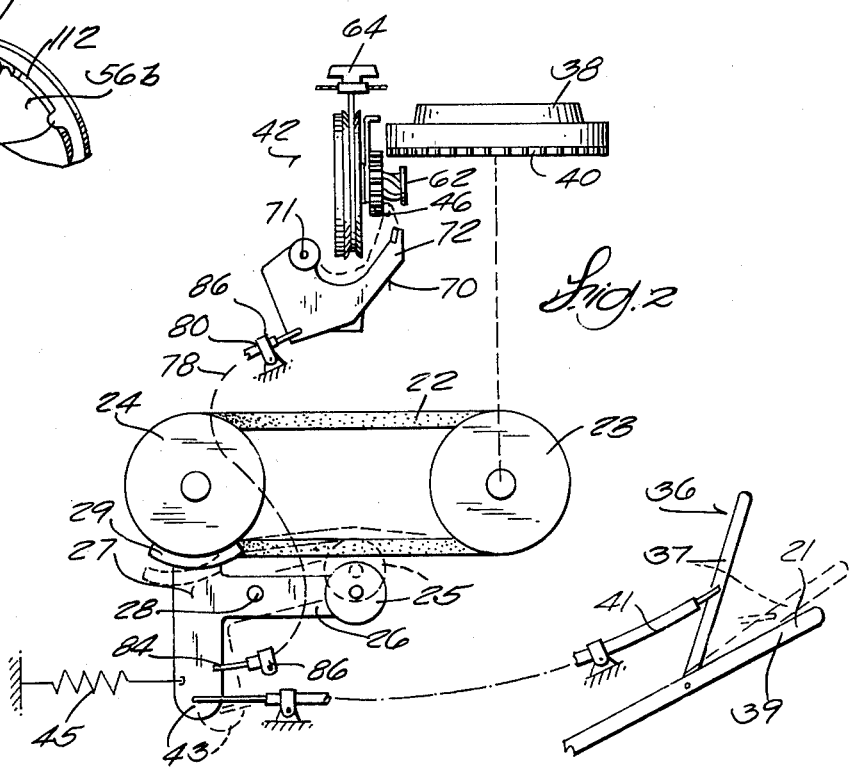

LAWN MOWER WITH CUTTER BLADE INTERLOCK

BACKGROUND OF THE INVENTION

The invention relates to lawn mowers. More particularly, the invention relates to lawn mowers including selectively operable arrangements for preventing starting of the engine. In addition the invention relates to lawn mowers including clutches between the prime mover and the cutter blade.

Attention is directed to the following United States Patent Nos.:

Nikonow, 1,231,637, issued July 3, 1917;
Pike, 2,938,511, May 31, 1960;
Musgrave, 2,957,561, Oct. 25, 1960;
Dowdle, 2,985,992, May 30, 1961;
Meldahl, 3,253,391, Dec. 30, 1963;
Musgrave, 3,460,325, Aug. 12, 1969;
DeBaille, 3,543,892, Dec. 1, 1970;
Berry, 3,739,763, June 19, 1973;
Niebuk, 3,741,187, June 26, 1973;
McBride, 3,782,350, Jan. 1, 1974;
Shriver, 3,871,159, Mar. 18, 1975.

Attention is also directed to U.S. Application Ser. No. 491,367 filed July 24, 1974, by Messrs. Fuelling and Jespersen, now U.S. Pat. No. 3,958,398, issued May 25, 1976.

SUMMARY OF THE INVENTION

The invention provides a lawn mower comprising a rotatable cutter blade supported on a frame, a prime mover supported on the frame, selectively operable means connected to the prime mover for starting thereof, a drive mechanism for selectively connecting the prime mover in driving engagement with the cutter blade, which drive mechanism is movable between a first or drive position wherein the prime mover is drivingly engaged with the cutter blade and a second or disengaged position wherein the prime mover is disengaged from the cutter blade, means biasing the drive mechanism toward the second or disengaged position, and interlock means operably connected to the drive mechanism and to the means for starting the prime mover for preventing starting of the prime mover when the drive mechanism is in the first or drive position.

In accordance with one embodiment of the invention, the prime mover is an electric motor, the selectively operable means for starting the electric motor comprises an electrical circuit for interconnecting the electric motor with a source of electric power, and a switch connected in the electrical circuit and selectively operable to interrupt the circuit between the electric motor and the electrical power source, and the means for preventing starting of the electric motor further includes means for operating the switch to interrupt the circuit when the drive mechanism is in the first position.

In accordance with an embodiment of the invention, the prime mover is an internal combustion engine, the selectively operable means for starting the engine comprises an electric starter, an electrical circuit for interconnecting the electric starter with a source of electric power, and a switch connected in the electrical circuit and being selectively operable to interrupt the circuit between the electric starter and the electrical power source, and the means for preventing engine starting further includes means for operating the switch to interrupt the circuit when the drive mechanism is in the first position.

In accordance with an embodiment of the invention, the prime mover comprises an engine including a starter gear, the means for starting the prime mover comprises a starter mechanism including a starter pinion movable to an engaged position in mesh with the starter gear, and means for rotating the pinion to start the engine, and the interlock means includes means for preventing engagement of the starter pinion with the starter gear.

In accordance with an embodiment of the invention, the starter mechanism includes a rotatable starter shaft, the starter pinion is carried on the shaft for movement relative to the shaft in response to rotation of the shaft to an engaged position in mesh with the starter gear, and means connected to the shaft for rotating the shaft to start the engine.

In accordance with an embodiment of the invention, the lawn mower further includes a handle on the frame, which handle includes a portion, and the drive mechanism includes a control member movably mounted on the handle, which control member includes a part located, when the drive mechanism is in the first or drive position, adjacent to the handle portion and located, when the drive mechanism is in the second or disengaged position, in a second or spaced position spaced from the handle portion.

In accordance with an embodiment of the invention, the handle part is biased by the biasing means into the second or spaced position.

In accordance with an embodiment of the invention, the mower further includes a brake shoe mounted on the frame for movement between a first non-braking position and a second braking position preventing rotation of the cutter blade and the brake shoe is biased by the biasing means toward the second position.

In accordance with an embodiment of the invention, the interlock means comprises a blocking element movable between a first position preventing starting of the prime mover and a second position permitting starting of the prime mover, and the means biasing the drive mechanism biases the blocking element to the position permitting starting of the prime mover.

In accordance with an embodiment of the invention, the drive mechanism includes an endless belt and an operating link which is movably mounted on the frame and which includes an idler wheel movable between a first position engaging the endless belt so as to remove slack therefrom and to effect driving engagement between the prime mover and the cutter blade and a second position spaced from the first position and effective to discontinue driving engagement between the prime mover and the cutter blade.

One of the principal features of the invention is the provision of a lawn mower which includes a clutch connecting a prime mover to a cutter blade and means for preventing starting of the prime mover when the clutch is conditioned to drivingly connect the prime mover to the cutter blade.

Another of the principal features of the invention is the provision of a lawn mower as referred to in the previous paragraph in which the cutter blade is braked when the clutch is conditioned to disengage the prime mover from the cutter blade.

Another of the principal features of the invention is the provision of a lawn mower including means for biasing a brake into operative position braking a cutter blade and for simultaneously withdrawing an interlock so as to permit initial engine starting operation only when the brake is applied to the cutter blade.

Other features and advantages of the embodiments of the invention will become apparent by reference to the following drawings.

BRIEF DESCRIPTION OF THE DRAWINGS

FIG. 1 is a side elevational view of a self-propelled lawn mower embodying various of the features of the invention.

FIG. 2 is a diagrammatic view of the cutter blade drive mechanism and starter interlock which is incorporated in the lawn mower of FIG. 1 and which is shown in full lines in the neutral or disengaged position and in dotted lines in the engaged or drive position.

FIG. 3 is an enlarged fragmentary view, partially in section, and partially schematic, of the engine starter mechanism and starter interlock which are included in the lawn mower shown in FIG. 1 and which are shown in the location when the drive mechanism is in the engaged or drive position.

FIG. 4 is an enlarged, fragmentary view of a second embodiment of a starter interlock.

FIG. 5 is an enlarged, fragmentary view of a third embodiment of a starter interlock.

GENERAL DESCRIPTION

Before explaining the embodiments of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Illustrated in the drawing is a lawn mower 10 including a prime mover 12, such as an internal combustion engine or an electric motor, partially covered by a shroud 14 and supported on a frame 15 including a blade housing 16. The lawn mower 10 includes a rotary cutter blade 18 located inside the blade housing 16, and is supported for travel along the ground by front and rear wheels 20. The mower 10 also includes a guide handle 21 for guiding the mower.

A suitable drive mechanism is provided for selectively connecting the prime mover 12 in driving engagement with the cutter blade 18. Various arrangements can be used for selectively engaging and disengaging the prime mover 12 and the cutter blade 18. For instance, various jaw clutch constructions, or disk clutch constructions, or centrifugal clutch constructions, or endless belt clutch constructions can be used. In the illustrated construction, the drive mechanism is of the endless belt type and includes an endless belt 22 which is trained around a drive pulley 23 driven by the prime mover 12 and a driven pulley 24 which, in turn, drives the cutter blade 18.

The drive mechanism also includes an idler wheel or pulley 25 which is rotatably carried on one arm 26 of an operating link 27 which is in the form of a bell crank lever and which is pivotally mounted at 28 on the frame 15. The operating link 27 and the idler wheel 25 are movable together about the pivot 28 between a first or drive position engaging the idler wheel 25 with the endless belt 22 so as to remove slack from the belt 22 and thereby to effect rotation of the cutter blade 18 by the prime mover 12, and a second or neutral position in which the idler wheel 25 is operatively disengaged from the endless belt 22 so as to discontinue power transmission from the prime mover 10 to the cutter blade 18.

Preferably the operating link 27 also carries a brake shoe 29 which is engageable with one of the endless belt 22 and the driven pulley 24 so as to brake the cutter blade 18 when the operating link or lever 27 is in the second or neutral position and which is moved clear of the driven pulley 24 or endless belt 22 when the operating link 27 is in the first or drive position so as thereby to permit unhindered driving of the cutter blade 18 by the prime mover 12.

Also included in the drive mechanism is a control means for movably operating the operating link 27 and the connected idler wheel 25 and brake shoe 29. While other constructions could be employed, in the illustrated construction, a control handle 36 (FIG. 1) is pivotally mounted on the guide handle 21 and includes a part 37 which is movable between a first or drive position adjacent to a portion 39 of the guide handle 21 and to a second or neutral position spaced from the handle portion 39.

The control member 36 is connected to the operating link 27 through a suitable linkage arrangement such as for instance the illustrated push-pull element or cable 41 which connects the control member 36 to the other arm 43 of the operating link 27. Other suitable linkages could be employed. The linkage is arranged so that, when the control member part 37 is in the neutral position spaced from the handle portion 39, the operating link 27 is in the neutral position wherein the idler wheel 25 is operatively disengaged from the endless belt 22 and the brake shoe 29 is in braking engagement with one or both of the driven pulley 24 and the endless belt 22 so as to prevent rotation of the cutter blade 18, and so that when the control member part 37 is in the drive position adjacent to the handle portion 39, the operating link 27 is in the drive position wherein the idler wheel 25 is operatively engaged with the endless belt 22 so as to effect transmission of driving power from the prime mover 10 to the cutter blade 18 and the brake shoe 29 is located in the non-braking position permitting unhindered cutter blade rotation.

Means are also provided for biasing the drive mechanism toward the neutral or second position wherein the control member part 37 is in the position spaced from the handle portion 39, wherein the operating link 27 is in the position operatively disengaging the idler pulley or wheel 25 from the endless belt 22 and engaging the brake shoe 29 so as to stop rotation of the cutter blade 18. While various arrangements can be employed, in the illustrated construction there is provided a tension spring 45 which, at one end, is anchored to the frame 15, and which, at the other end, is connected to the other arm 43 of the operating link 27 so as to normally bias the operating link 27 for rotation in the clockwise direction as shown in FIG. 2. Accordingly, power transmission to the cutter blade 18 does not occur and the cutter blade 18 is braked against rotation in the absence of action on the part of the operator to squeeze the control member 36 so as to locate the control member part 37 in adjacent relation to the handle portion 39.

Means are also provided for preventing prime mover starting operation when the drive mechanism is conditioned to rotate the cutter blade 18 by the prime mover 12. More specifically, in the construction shown in FIG. 3, the prime mover 12 constitutes an internal combustion engine including selectively operable means arranged for starting the engine and connected to an interlock which, in turn, is connected to the drive mechanism so as to prevent engine starting when the drive mechanism is in the drive position effecting rotation of the cutter blade 18 in response to engine operation.

Still more specifically, the internal combustion engine includes a rotatable flywheel 38 carrying an engine starter gear 40 (FIG. 3). Also mounted on the mower 10 is an engine starter mechanism 42 which is adapted to be actuated so as to engage the starter gear 40 and rotate the engine for starting. While various arrangements can be used, in the specific construction illustrated, the starting mechanism 42 includes a cylindrical frame or housing 44 fixed relative to the engine 12, a starter pinion 46 which is meshable with starter gear 40, and means for rotating the starter pinion 46 and axially displacing it between a retracted position axially spaced from the starter gear 40 and an advanced position in driving engagement with the starter gear 40. This last-mentioned means includes a combined pulley and worm drive gear assembly which includes a drive worm 48 carrying the starter pinion 46.

More particularly, the combined pulley and drive assembly has a drive member 50 including the drive worm 48 and a first circular pulley member 52. A second circular pulley member 56 is connected to the drive member 50 and cooperates with the first pulley member 52 to form a pulley for a pull rope 58. The drive member 50 is mounted on a shaft or pin 60 for rotation relative to the housing 44. Located near the outer end of the drive worm 48 is a retainer 62 for limiting the axial advance of the starter pinion 46 towards the starter gear 40.

The pull rope 58 includes a handle 64 and is normally wound up on the pulley formed between the pulley members 52 and 56 by a rewind or recoil spring (not shown) which is located inside the housing 44 and has one end anchored to the drive member 50 with the other end anchored to the inside of the housing 44. Mounted in an annular groove 65 on the starter pinion 46 for common axial movement with the starter pinion is a drag spring 66 which frictionally restrains rotary movement of the starter pinion. The drag spring 66 includes an offset leg 68 which, after initial rotation of the starter pinion 46, engages a fixed portion of the mower (as shown in FIG. 4) to prevent further rotation of the drag spring 66 even though the starter pinion 46 continues to rotate.

In operation, when the pull rope 58 is pulled, the drive worm 48 rotates in a clockwise direction as viewed in FIG. 4 to coil or to wind the recoil spring inside the housing 44. Upon release of the pull rope 58, the recoil spring uncoils or unwinds and thereby rotates the drive worm 48 in a counterclockwise direction, simultaneously rewinding the pull rope 58 on the pulley. In response to the clockwise rotation of the drive worm 48 during pulling of the pull rope 58, the drag spring 66 frictionally restrains rotation of the starter pinion 46 causing the starter pinion 46 to travel axially on the drive worm 48 from the retracted position to the advanced starter gear engagement position. Upon engaging the retainer 62, the starter pinion 46 meshes with the starter gear 40 and rotates with the drive worm 48, while rotating relative to the drag spring 66, to drive the starter gear 40.

The invention encompasses lawn mowers employing an electrical motor as the prime mover or motive source, as well as other starter mechanisms, as for instance, an electrically driven starter or other stored energy starting system, such as compressed gas, or a starter mechanism in which the starter pinion is displaced to the starter gear engaging position in response to rotation accompanying unwinding of a recoil spring which previously has been tensioned by a pull rope or other recoil spring tensioning means. Also, lawn mowers using reel-type cutter blades are within the invention.

In accordance with one embodiment of the invention, the starter interlock mechanism illustrated in FIG. 3 includes a blocking element 70 which is connected to the frame 15 about a pivot 71 for movement between a blocking position to prevent movement of the starter pinion 46 towards the starter gear engaging position and a nonblocking position, and means for moving the blocking element 70, in response to movement of the control member 36, to the blocking position when the control member part 37 is moved to the position which is located adjacent the handle portion 39 and which is effective to provide power transmission of the engine 12 to the cutter blade 18.

More specifically, the blocking element 70 includes an arm 72 which is engageable with the starter pinion 46 (when the blocking element 70 is in the solid line position shown in FIG. 3) to prevent axial movement of the starter pinion towards the starter gear engaging position. When the blocking element 70 is pivoted counterclockwise, as viewed in FIG. 3, the starter pinion 46 is free to move toward the starter gear engaging position.

While other arrangements can be used, in the specific construction illustrated, the means for moving the blocking element 70 in response to movement of the control member 36 includes a semi-flexible, push-pull element or wire 78 slidably mounted in a guide conduit 80. One end 82 of the wire 78 is connected to the blocking element 70 (FIG. 3) and the other end 84 is connected to the operating link 27 (FIG. 2). The guide conduit 80 is retained in place by brackets 86 mounted on the mower. The connection of the blocking element 70 to the operating link 28 serves to effect biasing of the blocking element by the spring 45 toward the nonblocking position. If desired, the blocking element 70 can be connected directly to the control member 36 by a push-pull element similar to the push-pull wire 78.

In the event the push-pull wire 78 is disconnected from the blocking element 70 or from the operating link 27 (or from the control member 36), so that the blocking element 70 is no longer under control of the operator, spring means are provided for biasing the blocking element 70 in the counterclockwise direction as shown in FIG. 3 so as to locate the arm 72 in the position interferring with axial movement of the starter pinion 46 toward the starter gear engaging position. While various spring arrangements can be employed, in the schematically illustrated construction, a compression spring 73 is mounted on a fixed part 75 of the lawn mower and engages the arm 72 so as to normally bias the blocking element 70 to the position preventing axial movement of the starter pinion toward the starter gear engaging position. It is noted that under normal circumstances, the tension spring 45 overpowers the spring 73. Thus, if the connection between the blocking element 70 and the operating link 27 (or control member 36) should fail, starting of the engine would be prevented.

In the specific construction illustrated in FIG. 3, the mower includes an electric starter (illustrated diagrammatically at 88) operatively connected to the engine 12 for starting and the pull rope 58 is used as an optional starting initiation means. Interconnected in the mower starter circuit 90 (shown diagrammatically) is a conventional on-off electrical switch 92 which includes an actuation plunger 94 engageable with a shoulder 96 on the blocking element 70. When the blocking element 70 is in the position shown in solid lines in FIG. 3 and dotted lines in FIG. 2, i.e., when the control member part is in the position adjacent to the handle portion 39, the drive mechanism is engaged, and the blocking element shoulder 96 engages the switch plunger 94 and opens the switch 92, interrupting the electrical circuit from a battery 98 to the starter motor 88. In this condition, the engine cannot be started either manually or electrically. When the blocking element 70 is in the full line position shown in FIG. 2, the control handle part 37 is relatively spaced from the handle portion 39, the drive mechanism is disengaged, the blocking element shoulder 96 is spaced from the switch plunger 94 and the switch 92 is closed, thereby completing the circuit so that the engine can be started either electrically or manually.

For lawn mowers which do not include the optional manual starting feature, the blocking element 70 can omit the arm 72. Otherwise, the blocking element is arranged to selectively actuate the switch 92 in generally the same manner as described above.

For electric lawn mowers employing an electric motor (not shown) as the prime mover, the electric circuit therefor can be arranged in generally the same manner as shown in FIG. 3 except, of course, the starter motor 88 is replaced by the electric motor. In this embodiment, the blocking element 70 can omit the arm 72 and the blocking element 70 is arranged to actuate the switch 92 and thereby selectively interrupt the power circuit to the electric motor in response to movement of the control member 36. Thus, the electric motor cannot be energized to drive the cutter blade when the control member part 37 is in the drive position, adjacent to the handle portion 39, but can be energized when the control handle part 37 is in the neutral or non-driving position spaced from the handle portion 39. Instead of using a battery as the source of electrical power for the electric motor, the electric circuit 90 can include an electrical connector for plugging into a conventional household outlet or the like.

In accordance with the alternate embodiment illustrated in FIG. 4, the starter interlock mechanism is arranged to prevent full rotation of the starter member 50 when the control member 36 is in the drive position. In this embodiment, the starter interlock mechanism includes a plurality of circumferentially spaced, axially extending stops 102 located on the outer face of the circular member 56a. A lever or pawl 104 is pivotally mounted for movement between an operating position where the pawl 104 can abuttingly engage one of the stops 102 to prevent rotation of the starter member 50 and a non-operating position axially spaced from the stops 102 (as shown in FIG. 4) where the circular members 52 and 56a, and thus the starter member 50, can be rotated to start the engine. The stops 102 can be arranged in any suitable manner to serve as a stop abutment for the pawl 104. In the specific construction illustrated in FIG. 4, the stops 102 are in the form of tabs formed integrally from the circular member 56a.

The pawl 104 is pivotally mounted on a bracket 106 which in turn is mounted on the mower. A push/pull element 110 having the same general construction as the push/pull element 78 is connected, at one end, to the pawl 104 and, at the other end, is connected either to the link or bell crank lever 27 or directly to the control member 36 as described above. A spring 173 operable to locate the pawl 104 in a blocking position can be located around the pivot to bias the pawl 104 in the counterclockwise direction. However, as with the spring 73, the spring 173 would normally be over powered by the spring 45 and would be operative in the event of disconnection of the pawl 104 from the remainder of the mechanism.

FIG. 5 illustrates a modified construction for the embodiment illustrated in FIG. 4. The circular pulley member 56b has an axially extending flange 112 which includes a plurality of circumferentially spaced notches 114 for releasably receiving an offset portion 116 of the pawl 104a to lock the starter member 50 against further rotation and thereby prevent the engine from being started when the control handle 36 is in the drive position. Suitable means, such as a push-pull element, is provided for connecting the pawl 104a to the control member 36 so that it operates in the same general manner as the embodiment illustrated in FIG. 4.

Various of the features of the invention are set forth in the following claims.

What is claimed is:

1. A lawn mower comprising a frame, a rotatable cutter blade supported on said frame, a prime mover supported on said frame, selectively operable means connected to said prime mover for starting thereof, a drive mechanism for selectively connecting said prime mover in driving engagement with said cutter blade, said drive mechanism being movable between a first position wherein said prime mover is drivingly engaged with said cutter blade and a second position wherein said prime mover is disengaged from said cutter blade, means biasing said drive mechanism toward the second position, and interlock means operably connected to said drive mechanism and to said means for starting said prime mover and including an element movable between a first position preventing starting of said prime mover when said drive mechanism is in the first position and a second position permitting starting of said prime mover when said drive mechanism is in the second position, said biasing means also biasing said element toward the second position.

2. A lawn mower in accordance with claim 1 wherein said prime mover is an electric motor, wherein said selectively operable means for starting said electric motor comprises an electrical circuit for interconnecting said electric motor with a source of electric power, a switch connected in said electrical circuit and being selectively operable to interrupt said circuit between said electric motor and said electrical power source, and wherein said element operates said switch to interrupt said circuit when said drive mechanism is in the first position.

3. A lawn mower in accordance with claim 1 wherein said prime mover is an internal combustion engine, wherein said selectively operable means for starting said engine comprises an electric starter, an electrical circuit for interconnecting said electric starter with a source of electric power, and a switch connected in said electrical circuit and being selectively operable to interrupt said circuit between said electric starter and said electrical power source, and wherein said element operates said switch to interrupt said circuit when said drive mechanism is in said first position.

4. A lawn mower in accordance with claim 1 wherein said prime mover comprises an engine including a starter gear, and said means for starting said prime mover comprises a starter mechanism including a starter pinion movable to an engaged position in mesh with said starter gear, and means for rotating said pinion to start said engine, and wherein said element prevents engagement of said starter pinion with said starter gear when said element is in the first position.

5. A lawn mower in accordance with claim 1 wherein said prime mover comprises an engine having a starter gear, wherein said means for starting said prime mover comprises a starter mechanism including a rotatable starter shaft, a starter pinion carried on said shaft for movement relative to said shaft in response to rotation of said shaft to an engaged position in mesh with said starter gear, and means connected to said shaft for rotating said shaft to start said engine, and wherein said element is operative to prevent said starter pinion from meshing with said starter gear when rotation of said starter shaft is attempted with said drive mechanism in the first position.

6. A lawn mower according to claim 5 wherein said starter pinion is carried on said shaft for axial movement relative to said shaft and said element includes a blocking element pivotally mounted for movement between a blocking position to prevent movement of said starter pinion into meshing engagement with said starter gear and a non-blocking position permitting movement of said starter pinion into engagement with said starter gear, and further including means connecting said blocking element to said drive mechanism for moving said blocking element in response to movement of said drive mechanism such that said blocking element is in the blocking position when said drive mechanism is in the first position and said driving element is in the non-blocking position when the said drive mechanism is in the second position.

7. A lawn mower according to claim 5 wherein said means for rotating said shaft includes a circular member mounted on said shaft and a starter rope wound on said circular member and having one end affixed to said circular member and a free end which is pulled to rotate said starter shaft, wherein said interlock means includes a plurality of circumferentially spaced abutment means on one face of said circular member, a pawl movably mounted for movement between an operating position wherein said pawl is engageable with one of said abutment means to prevent rotation of said shaft and a non-operating position where said pawl is not engageable with said abutment means, and means connecting said pawl to said drive mechanism for moving said pawl in response to the movement of said drive mechanism such that said pawl is in the operating position when said drive mechanism is in the first position and such that said pawl is in the non-operating position when said drive mechanism is in the second position.

8. A lawn mower according to claim 7 wherein said abutment means comprises a plurality of circumferentially spaced, axially projecting tabs formed integrally from said circular member.

9. A lawn mower according to claim 8 wherein said circular member includes an axially extending, annular flange, and said abutment means comprises a plurality of circumferentially spaced notches in said flange for receiving said pawl and locking said shaft against rotation when said control means is in the operating position.

10. A lawn mower in accordance with claim 1 and further including a handle on said frame, said handle including a portion, and wherein said drive mechanism includes a control member movably mounted on said handle, said control member including a part located, when said drive mechanism is in the first position, adjacent to said handle portion and located, when said drive mechanism is in the second position, in a second position spaced from said handle portion.

11. A lawn mower in accordance with claim 10 wherein said part is biased by said biasing means into the second position.

12. A lawn mower in accordance with claim 1 and further including a handle on said frame, said handle including a portion, wherein said drive mechanism includes a control member movably mounted on said handle, said control member including a part located, when said drive mechanism is in the first position, in a first position adjacent to said handle portion and located, when said drive mechanism is in the second position, in a second position spaced from said handle portion, wherein said drive mechanism further includes an operating link mounted on said frame for movement between a first position when said drive mechanism is in said first position and a second position when said drive mechanism is in said second position, and wherein said biasing means simultaneously biases said control member, said operating link, and said element to the second positions.

13. A lawn mower in accordance with claim 12 wherein said lawn mower further includes a brake shoe mounted on said frame for movement between a first non-braking position and a second braking position preventing rotation of said cutter blade and wherein said brake shoe is biased by said biasing means toward said second position.

14. A lawn mower in accordance with claim 13 wherein said brake shoe is carried by said operating link.

15. A lawn mower in accordance with claim 1 wherein said drive mechanism includes an endless belt and an operating link movably mounted on said frame and including an idler wheel movable between a first position engaging said endless belt so as to remove slack therefrom and to effect driving engagement between said prime mover and said cutter blade and a second position spaced from the first position and effective to discontinue driving engagement between said prime mover and said cutter blade.

16. A lawn mower in accordance with claim 1 and further including brake means connected to said cutter blade and operable in response to operation of said drive mechanism to prevent rotation of said cutter blade when said drive mechanism is in the second position and to permit unhindered rotation of said cutter blade when said drive mechanism is in the first position.

17. A lawn mower in accordance with claim 12 and further including second biasing means engaging said element and urging said element toward said first position, said second biasing means normally being overpowered by said first mentioned biasing means and being operable to locate said element in said first position in the event of disconnection of said element from said drive mechanism.

* * * * *